(12) United States Patent  (10) Patent No.: US 8,941,349 B2
Inoue  (45) Date of Patent: Jan. 27, 2015

(54) MOTOR DRIVE CIRCUIT

(71) Applicant: Minebea Co., Ltd., Kitasaku-gun, Nagano (JP)

(72) Inventor: Tomohiro Inoue, Yonago (JP)

(73) Assignee: Minebea Co., Ltd., Kitasaku-gun (JP)

( * ) Notice: Subject to any disclaimer, the term of this patent is extended or adjusted under 35 U.S.C. 154(b) by 148 days.

(21) Appl. No.: 13/860,053

(22) Filed: Apr. 10, 2013

(65) Prior Publication Data

US 2013/0320892 A1    Dec. 5, 2013

(30) Foreign Application Priority Data

May 29, 2012  (JP) ................. 2012-122118

(51) Int. Cl.
    *H02P 23/00*    (2006.01)
    *H02P 6/14*    (2006.01)
(52) U.S. Cl.
    CPC ............................ *H02P 6/145* (2013.01)
    USPC ................ 318/799; 318/798; 318/400.14
(58) Field of Classification Search
    USPC .................. 318/461, 727, 798, 799, 400.14
    See application file for complete search history.

(56) References Cited

U.S. PATENT DOCUMENTS

| | | | | |
|---|---|---|---|---|
| 5,195,067 A | * | 3/1993 | Yanagi | 369/30.17 |
| 5,886,744 A | * | 3/1999 | Hannah | 375/240.16 |
| 6,121,736 A | * | 9/2000 | Narazaki et al. | 318/400.35 |
| 2007/0007925 A1 | * | 1/2007 | Yamane | 318/600 |

FOREIGN PATENT DOCUMENTS

JP    A-2005-192338    7/2005

* cited by examiner

*Primary Examiner* — Rina Duda
(74) *Attorney, Agent, or Firm* — Oliff PLC

(57) ABSTRACT

A motor drive circuit includes: an advance angle setting correcting device having a correction reference cycle according to a reference advance angle count value, in which a correction amount is calculated as a ratio of the correction reference cycle to a cycle of a detection signal indicating a detected frequency proportional to a motor rotation speed, and in which an advance angle setting signal is obtained by multiplying the correction amount by a proportionality factor; and an advance angle setting device in which the advance angle correction value is added to the reference advance angle count value thereby outputting an advance angle setting signal, wherein a drive command signal containing a rotation speed information based on a target rotation speed is externally fed, the motor rotation speed is variably controlled in response to the drive command signal, and the detection signal is fed from a rotation speed detecting device.

8 Claims, 3 Drawing Sheets

MOTOR DRIVE CIRCUIT

BACKGROUND OF THE INVENTION

1. Field of the Invention

The present invention relates to a motor drive circuit adapted to control the rotation speed of a motor in a variable manner.

2. Description of the Related Art

Recently, OA (office automation) devices, such as copying machines, page printers, and the like, have been and being developed more and more with colorization, enhanced definition and digitization, and accordingly a motor that is used in those equipment is required to operate in a wide range of rotation speed and also with a high accuracy of rotation speed. In a drive circuit to drive such a motor, it is required to provide an optimum control capability at every rotation speed through the wide range of rotation speed.

Also, as to a driving method to drive such a motor, from a viewpoint of reducing noises, a sine wave driving in which a voltage applied to a motor winding is shaped to have a sine wave form is more and more employed generally in place of a rectangular wave driving conventionally used. It is known that an advance angle control to adjust a delay of the phase of a winding current with respect to the phase of a motor inductive voltage is essential in order to maintain a high efficiency for the aforementioned sine wave driving.

Referring to FIG. 3, a controller 107 is shown as a conventional motor drive circuit which is provided with a function of controlling an advance angle (refer to, for example, Japanese Patent Application Laid-Open No. 2005-192338). The controller 107 shown in FIG. 3 is an example of a motor drive circuit to drive a three-phase brushless motor (hereinafter, referred to simply as a motor) 106 used in a hydraulic power steering system.

The controller 107 includes: a target rotation speed calculating device 173 to calculate a target rotation speed based on inputs sent from a rudder angle sensor 111 and also from a vehicle speed sensor 112; and a rotation speed calculating device 174 to calculate a rotation speed of the motor 106 based on an input sent from a rotation position detecting sensor 171, wherein a deviation between the target rotation speed and the actual rotation speed is fed to a rotation speed controlling device 175. Then, the rotation speed controlling device 175 as well as a PWM controlling device 176 act to set a control voltage by a proportional control and an integral control, whereby the rotation speed of the motor 106 is controlled via a drive circuit 172.

And, in a phase controlling device 177 of the controller 107, an optimum energization phase of the drive circuit 172 is obtained based on control parameters, such as a proportional term, an integral term and the like, which are calculated at the rotation speed controlling device 175, and the result of the calculation is reflected at the PWM controlling device 176, whereby an advance angle control is performed.

Further, another conventional motor drive circuit is proposed, which is adapted to control a rotation speed varying in a wide range, and which is configured such that two advance angle values are predetermined and such that the advance angle values predetermined are switched over by a level High/ Low of a voltage applied to an advance angle value setting terminal.

For example, in an advance angle value setting circuit shown in FIG. 4, a High/Low level of a voltage applied to a PS terminal (advance angle value setting terminal) is set by Open/Short (GND) of the condition of a PSO terminal, and a setting of an advance angle value is changed over in response to the switchover of the aforementioned voltage level setting. A signal for switching the condition of the PSO terminal is usually supplied from outside via an interface of the motor drive circuit according to the rotation speed of a motor, or the like.

As described above, the controller 107 shown in FIG. 3 is provided with the target rotation speed calculating device 173 which functions to calculate the target rotation speed of the motor 106 based on inputs sent from the rudder angle sensor 111 and the vehicle speed sensor 112, and also provided with the rotation speed controlling device 175 to which a deviation between the target rotation speed and the actual rotation speed is fed, wherein an advance angle control is performed based on control parameters, such as a proportional term, an integral term, and the like, which are obtained at the rotation speed controlling device 175. Therefore, the advance angle control which is performed in the controller 107 cannot be performed in a motor drive circuit in which a rotation speed controlling device based on a target rotation speed (target speed) is not provided.

Also, in the configuration of such a circuit as shown in FIG. 4, in which an advance angle value is switched over according to a signal level applied to an advance angle value setting terminal, for example, if the number of corresponding advance angle values is to be increased for the purpose of performing a control with a higher degree of accuracy, a complicated switching circuit is required, in which a large number of resistors and switch elements, or the like must be provided.

The present invention has been made in light of the above problems, and it is an object of the present invention to provide a motor drive circuit which is enabled to variably control the rotation speed of a motor, and in which an appropriate advance angle value can be automatically set in accordance with the motor rotation speed.

The embodiment shown in the following description of the invention is presented in order to exemplify a configuration according to the present invention and serves to provide an explanation on an aspect-by-aspect basis for the purpose of facilitating understanding of the diversity of the configuration of the present invention. Each aspect does not limit the technical scope of the present invention, and modifications which, in consideration of the best embodiment mode for carrying out the present invention, are developed by replacing, eliminating a part of the constituent elements of each aspect, or further by adding some other constituent elements thereto may be included in the technical scope of the present invention.

In order to achieve the object described above, according to a first aspect of the present invention, there is provided a motor drive circuit configured to include: an advance angle setting correcting device which has a correction reference cycle predetermined according to a reference advance angle count value and in which a correction amount is calculated as a ratio of the correction reference cycle to a cycle of a detection signal indicating a detected frequency proportional to a rotation speed of a motor and in which an advance angle setting signal is obtained in such a manner that the correction amount is multiplied by a proportionality factor; and, an advance angle setting device in which the advance angle correction value is added to the reference advance angle count value thereby outputting an advance angle setting signal. In the configuration described above, a drive command signal containing a rotation speed information based on a target rotation speed is fed to the motor drive circuit from outside, the rotation speed of the motor is variably controlled in response to the drive command signal, and the detection signal indicating a detected frequency proportional to the rotation speed of the motor is fed to the motor drive circuit from a rotation speed detecting device attached to the motor.

According to the motor drive circuit described in the first aspect, an advance angle value can be automatically corrected depending on the fluctuation of the detection signal fed from the rotation speed detecting device, and therefore the efficiency of driving a motor can be optimized at each rotation speed of the motor running with a rotation speed variation in the motor drive circuit to variably control the rotation speed of the motor.

Also, according to the motor drive circuit described in the first aspect, an advance angle setting is corrected based on the detection signal fed from the rotation speed detecting device, and therefore a target rotation speed does not need to be fed from outside for performing an advance angle control, which eventually results in that the advance angle control of the motor can be performed by a simple and inexpensive motor drive circuit which does not include a rotation speed controlling device adapted to work based on a target rotation speed.

Further, according to the motor drive circuit described in the first aspect, an advance angle setting is corrected automatically depending on the rotation speed of the motor inside the motor drive circuit, and therefore a circuit for switching an advance angle value, an interface for introducing a switching signal from outside, and the like are not required, whereby the efficiency of driving motor can be optimized by a simple and inexpensive configuration.

According to a second aspect of the present invention, the motor drive circuit as described in the first aspect may further include a cycle detecting counter to output a detection cycle count value corresponding to a cycle of the detection signal calculated based on a reference clock, wherein the advance angle setting correcting device has a correction reference count value corresponding to the correction reference cycle and includes a division device to divide the correction reference count value by the detection cycle count value thereby calculating the correction amount.

According to the second aspect of the present invention, the motor drive circuit, in which an advance angle value can be automatically corrected depending on the fluctuation of the cycle of the detection signal fed from the rotation speed detecting device, can be configured as a fully digital processing circuit which does not employ an analog circuit (for example, an integration amplifier, a resistor and a capacitor). The motor drive circuit, especially when formed of an integrated circuit (IC), can be achieved as a high-performance circuit which, by utilizing microfabrication process for building more digital circuits in a small area, can be realized with an IC which has a small chip area and which is available at a low cost.

According to a third aspect of the present invention, in the motor drive circuit as described in the first or second aspect, the advance angle setting correcting device may have a plurality of the correction reference cycles.

According to the motor drive circuit described in the third aspect of the present invention, an optimum advance angle setting correction can be performed flexibly and easily with regards to a motor which runs with a wide range of rotation speed variation.

According to a fourth aspect of the present invention, in the motor drive circuit as described in any one of the first, second and third aspects, the rotation speed information contained in the drive command signal may be either a voltage command signal corresponding to the target rotation speed or a PWM duty command signal.

The motor drive circuit according to the present invention is configured as described above and therefore enables, while variably controlling the rotation speed of a motor, to automatically set an appropriate advance angle value in accordance with the motor rotation speed and thus to optimize the efficiency of driving the motor.

DETAILED DESCRIPTION OF THE INVENTION

An exemplary embodiment of the present invention will hereinafter be described in conjunction with the accompanying drawings.

Figure 1:
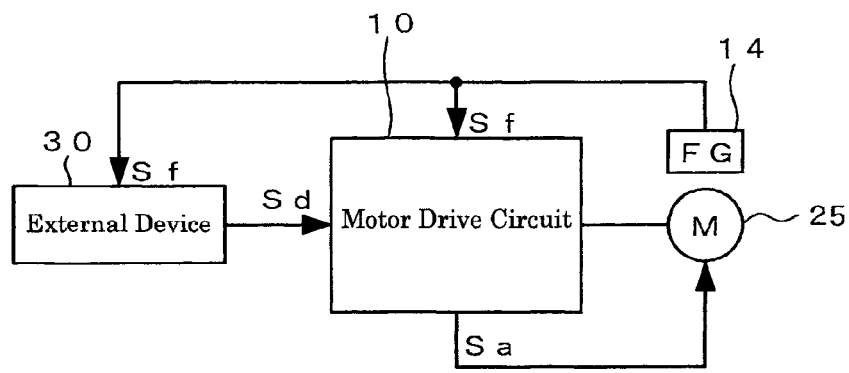
FIG. 1 is a block diagram schematically illustrating a motor drive system including a motor drive circuit according to an embodiment of the present invention.

FIG. 1 schematically illustrates a motor drive system to which a motor drive circuit 10 according to the embodiment is preferably applied.

The motor drive system shown in FIG. 1 includes a motor 25 and the aforementioned motor drive circuit 10. A frequency generator (hereinafter, referred to also as FG) 14 as a rotation speed detecting device is attached to the motor 25. A signal (hereinafter, referred to as detection signal, as appropriate) Sf indicating a detected frequency proportional to the speed (rotation speed) of the motor 25 is fed to the motor drive circuit 10 from the FG 14, and also a drive command signal Sd is fed to the motor drive circuit 10 from an external device (for example, a high-order system of the motor drive circuit 10) 30.

In the motor drive system shown in FIG. 1, a reference signal (not shown in the figure) corresponding to the target rotation speed of the motor 25, as well as the detection signal Sf sent from the FG 14, is fed to the external device 30, and the external device 30 functions to send to the motor drive circuit 10 the drive command signal Sd containing an information on the rotation speed based on the target rotation speed.

In the embodiment, the motor drive circuit 10 is not provided with a rotation speed controlling device to control the rotation speed of the motor 25 based on the target rotation speed and is configured to variably control the rotation speed of the motor 25 based on the drive command signal Sd fed to the motor drive circuit 10. Specifically, the drive command signal Sd is a voltage command signal corresponding to the target rotation speed or a PWM duty command signal.

Figure 2:
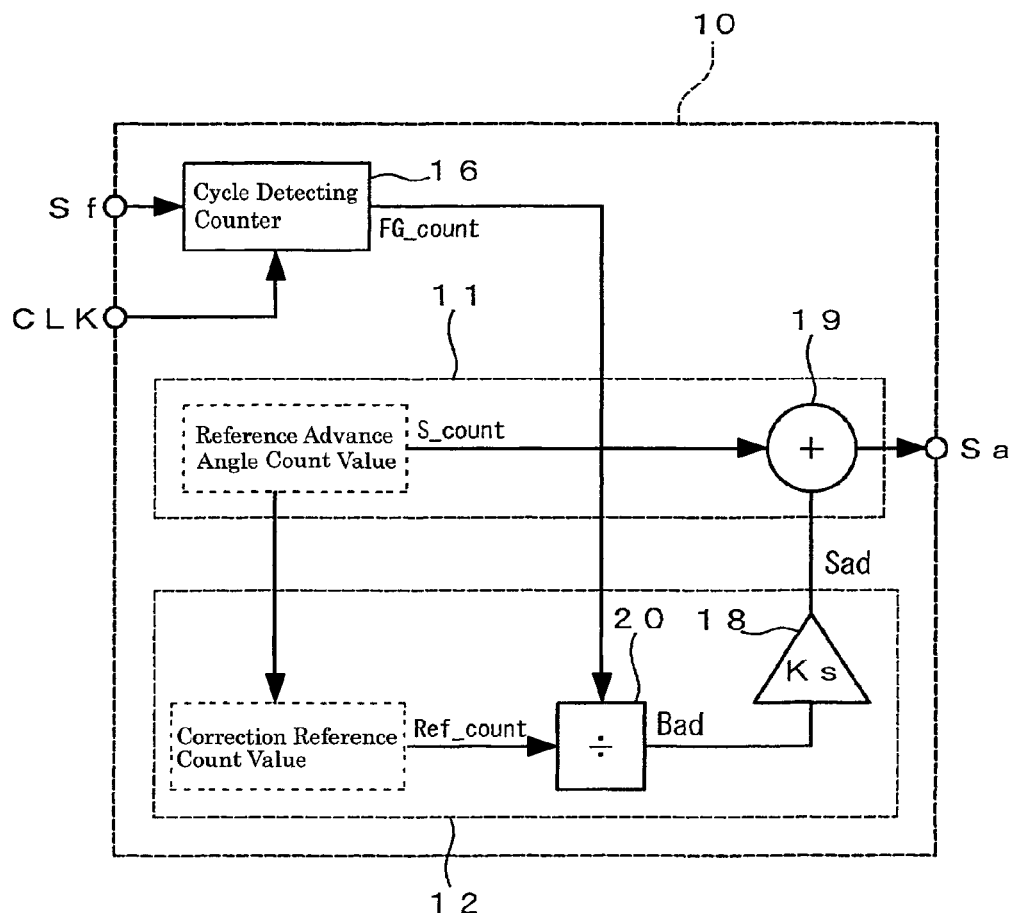
FIG. 2 is a function block diagram illustrating a relevant portion of the motor drive circuit according to the embodiment of the present invention.
Figure 3:
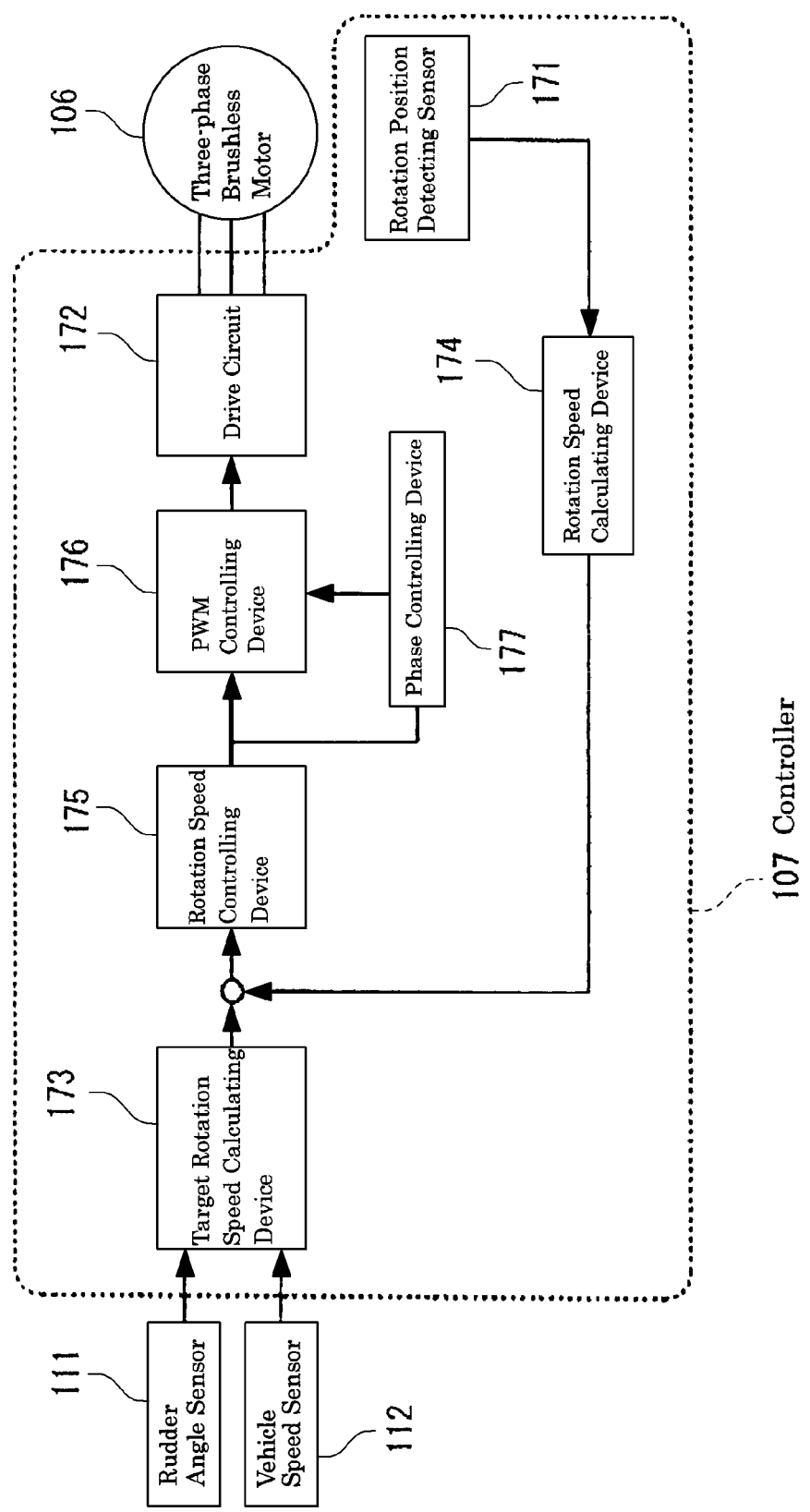
FIG. 3 is a circuit configuration diagram illustrating a conventional motor drive circuit.
Figure 4:
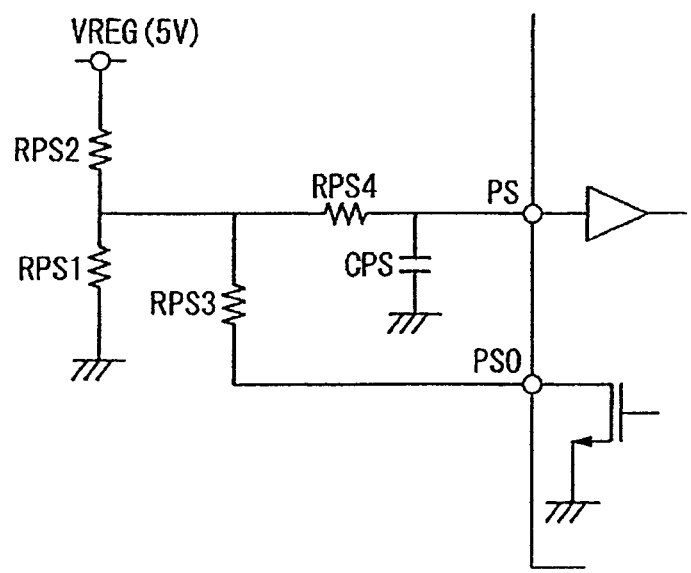
FIG. 4 is a circuit configuration diagram illustrating another conventional motor drive circuit.

FIG. 2 is a function block diagram illustrating a relevant portion of the motor drive circuit 10 according to the embodiment. The motor drive circuit 10 is provided with a cycle detecting counter 16 to which the detection signal Sf is fed, and a constant cycle of reference clock CLK is fed to the cycle detecting counter 16.

While the motor drive circuit 10 preferably includes thereinside a device (not shown in the figure) of generating the reference clock CLK, it may alternatively be configured in the present invention such that the reference clock CLK is fed to the motor drive circuit 10 from outside. The motor drive circuit 10 further includes an advance angle setting device 11 which includes an addition device 19, and an advance angle setting correcting device 12 which includes a multiplication device 18 provided with a predetermined proportionality factor Ks and a division device 20.

In the embodiment, the cycle detecting counter 16, insofar as it is adapted appropriately to calculate the cycle of the detection signal Sf based on the reference clock CLK and to output a calculated value (detection cycle count value) FG-count, may be arbitrarily configured in a practical implementation.

For example, the cycle detecting counter 16 may be configured to include: a free-run counter adapted to count up every time when each pulse signal to constitute the reference clock CLK is fed; and an input capture register adapted to detect the rise of an input signal and to capture the count value of the free-run counter at the time point of the detection, wherein a difference is calculated between two count values captured respectively at two successive time points, whereby the number of pulses of the reference clock CLK fed during one cycle of input signal is output as a count value corresponding to the cycle of input signal.

In the motor drive circuit 10, the advance angle setting device 11 has a predetermined reference advance angle count value as a corresponding reference advance angle count value S-count. The reference advance angle count S-count is fed to the addition device 19, and then, in the addition device 19, is added to an advance angle correction value Sad which is obtained such that a correction amount Bad to be described herein later is multiplied by a proportionality factor Ks, whereby an advance angle setting signal Sa is obtained. And, the advance angle setting signal Sa obtained as described above is output.

Meanwhile, a detection cycle counts value FG-count corresponding to the cycle of the detection signal Sf is output from the cycle detecting counter 16. The advance angle setting correcting device 12 has a predetermined correction reference cycle as a corresponding correction reference count value Ref-count, and the detection cycle count value FG-count and the correction reference count value Ref-count are fed to the division device 20.

In the division device 20, the correction amount Bad mentioned earlier is calculated by "Ref-count/FG-count" as a ratio of the correction reference cycle to the cycle of the detection signal Sf. The correction amount Bad is fed to the multiplication device 18, and then multiplied by a predetermined proportionality factor Ks, and thereby the advance angle correction value Sad is calculated.

And, the advance angle correction value Sad is sent from the multiplication device 18 to the addition device 19 of the advance angle setting device 11, whereby the reference advance angle count value (reference advance angle count value S-count) is corrected.

Thus, in the motor drive circuit 10, the reference advance angle count value (reference advance angle count value S-count) is automatically corrected by the advance angle correction value Sad according to the cycle of the detection signal Sf (detection cycle count value FG-count). Therefore, if the cycle of the detection signal Sf (that is, the rotation speed of the motor 25) fluctuates, the advance angle can be set appropriately with respect to every rotation speed, and eventually the efficiency of driving a motor can be optimized.

In the operation described above, since an advance angle setting is corrected based on the detection signal SI in the motor drive circuit 10, a target rotation speed does not need to be fed to the motor drive circuit 10 from outside for the purpose of performing the advance angle control. Consequently, the motor drive circuit 10 can be realized with a simple and low-cost configuration, wherein a rotation speed controlling device based on a target rotation speed is not equipped.

Further, as described above, in the advance angle setting correcting device 12, "the correction reference cycle/the cycle of the detection signal Sf" (Ref-count/FG-count) is used as the correction amount Bad (this is equivalent to that a correction reference rotation speed proportional to "1/the correction reference cycle" is set and that a value figured out in such a manner that the rotation speed of the motor 25 proportional to "1/the cycle of the detection signal Sf" is normalized by the correction reference rotation speed set as described above is used as a rotation speed for correction.

The configuration described above is favorable, especially, for controlling a motor with a wide variable rotation speed range, as will be explained herein later.

Specifically, when controlling a motor configured to operate with a wide range of rotation speed variation, there is a case where, for the purpose of optimizing the efficiency of driving a motor, different advance angle settings are demanded according respectively to a plurality of rotation speed zones (for example, a low rotation speed zone, a medium rotation speed zone, a high rotation speed zone, and the like) within each of which the rotation speed of the motor 25 falls.

In order to meet such a demand, the motor drive circuit 10 may alternatively be configured to include a plurality of correction reference cycles (for example, correction reference cycles provided for the low, medium and high rotation speed zones, respectively) which are respectively appropriate for the plurality of rotation speed zones, wherein the correction reference cycle (specifically, a corresponding correction reference count value Ref-count) used for calculating a correction amount is switched depending on the rotation speed zone within which the rotation speed of the motor 25 falls.

In this connection, it is preferable for the motor drive circuit 10 to be configured such that the correction reference cycle is automatically switched in conjunction with the cycle of the detection signal Sf (detection cycle count value FG-count).

With the configuration described above, even when the rotation speed of the motor 25 varies in a wide range, the correction amount of the advance angle value can be switched flexibly and easily so that the efficiency of driving the motor 25 is optimized.

And also, when the number of rotation speed zones is increased, the number of component members for the motor drive circuit 10 does not need to be increased, and the correction amount of the advance angle value can be switched easily by increasing the correction reference cycle to be captured as data in the advance angle setting correction device 12.

In this connection, the motor drive circuit 10 may alternatively be configured to include a universally known drive circuit (not shown in the figure) which drives the motor 25 based on the advance angle setting signal Sa sent from the addition device 19 (and a control signal sent from other control device not shown in the figure: for example, a rotation speed control device and a phase control device.

The motor drive circuit 10 described above is configured such that the cycle of the detection signal Sf is introduced as the detection cycle count value (that is, numerical data) FG-count and that all subsequent processes can be performed as arithmetic processing of numerical data.

Consequently, the motor drive circuit 10, insofar can be achieved as a fully digital processing circuit in which an analog circuit is not used, wherein each of the constituent elements of the motor drive circuit 10 can be realized by any appropriate hardware or software, or by combination thereof, insofar as the function of each of the function blocks described with reference to FIG. 2 can be duly performed.

The above described characteristic of the motor drive circuit 10 is especially favorable when the motor drive circuit 10 is made of an integrated circuit (IC), in view of realizing a high-performance motor drive circuit by using an IC which has a small chip area and available at a low cost.

The present invention has been described with respect to the preferred embodiment but is by no means limited to the specific embodiment. For example, the present invention may also be configured such that an arbitrary constituent element of a motor drive circuit is formed of an analog circuit having an equivalent function. Further, the rotation speed detecting device for the motor 25 may be formed of a position detecting element, such as a Hall element, instead of the FG14.

What is claimed is:

1. A motor drive circuit comprising:
an advance angle setting correcting device which has a correction reference cycle predetermined according to a reference advance angle count value, in which a correction amount is calculated as a ratio of the correction reference cycle to a cycle of a detection signal indicating a detected frequency proportional to a rotation speed of a motor, and in which an advance angle setting signal is obtained in such a manner that the correction amount is multiplied by a proportionality factor; and
an advance angle setting device in which the advance angle correction value is added to the reference advance angle count value thereby outputting an advance angle setting signal,
wherein a drive command signal containing a rotation speed information based on a target rotation speed is fed to the motor drive circuit from outside, the rotation speed of the motor is variably controlled in response to the drive command signal, and wherein the detection signal indicating a detected frequency proportional to the rotation speed of the motor is fed to the motor drive circuit from a rotation speed detecting device attached to the motor.

2. A motor drive circuit according to claim 1, further comprising a cycle detecting counter to output a detection cycle count value corresponding to a cycle of the detection signal calculated based on a reference clock, wherein the advance angle setting correcting device has a correction reference count value corresponding to the correction reference cycle and comprises a division device to divide the correction reference count value by the detection cycle count value thereby calculating the correction amount.

3. A motor drive circuit according to claim 1, wherein the advance angle setting correcting device has a plurality of the correction reference cycles.

4. A motor drive circuit according to claim 1, wherein the rotation speed information contained in the drive command signal is one of a voltage command signal corresponding to the target rotation speed and a PWM duty command signal.

5. A motor drive circuit according to claim 2, wherein the advance angle setting correcting device has a plurality of the correction reference cycles.

6. A motor drive circuit according to claim 2, wherein the rotation speed information contained in the drive command signal is one of a voltage command signal corresponding to the target rotation speed and a PWM duty command signal.

7. A motor drive circuit according to claim 3, wherein the rotation speed information contained in the drive command signal is one of a voltage command signal corresponding to the target rotation speed and a PWM duty command signal.

8. A motor drive circuit according to claim 5, wherein the rotation speed information contained in the drive command signal is one of a voltage command signal corresponding to the target rotation speed and a PWM duty command signal.

* * * * *